US012098036B2

(12) United States Patent
Ruffino et al.

(10) Patent No.: US 12,098,036 B2
(45) Date of Patent: Sep. 24, 2024

(54) MEASUREMENT ASSEMBLY FOR MEASURING WEAR OF THE SURFACE OF REVOLUTION OF ROTATING MEMBERS, A MACHINE THAT INCORPORATES SAID ASSEMBLY AND METHOD OF MEASUREMENT

(71) Applicant: AROL S.P.A., Canelli (IT)

(72) Inventors: Denis Ruffino, Canelli (IT); Fabio Pregno, Canelli (IT)

(73) Assignee: AROL S.P.A., Canelli (IT)

( * ) Notice: Subject to any disclaimer, the term of this patent is extended or adjusted under 35 U.S.C. 154(b) by 116 days.

(21) Appl. No.: 18/017,486

(22) PCT Filed: Jul. 26, 2021

(86) PCT No.: PCT/IB2021/056749
§ 371 (c)(1),
(2) Date: Jan. 23, 2023

(87) PCT Pub. No.: WO2022/023939
PCT Pub. Date: Feb. 3, 2022

(65) Prior Publication Data
US 2023/0356957 A1 Nov. 9, 2023

(30) Foreign Application Priority Data

Jul. 27, 2020 (IT) .................. 102020000018109

(51) Int. Cl.
*B65G 43/02* (2006.01)
*B65G 21/22* (2006.01)
*F16D 66/02* (2006.01)

(52) U.S. Cl.
CPC ............. *B65G 43/02* (2013.01); *B65G 21/22* (2013.01); *F16D 66/028* (2013.01); *B65G 2207/48* (2013.01)

(58) Field of Classification Search
None
See application file for complete search history.

(56) References Cited

U.S. PATENT DOCUMENTS 4,721,138 A * 1/1988 Simonazzi .............. B67C 3/242
292/170
5,732,528 A * 3/1998 Peronek ................. B67C 3/242
53/201

(Continued)

FOREIGN PATENT DOCUMENTS

| CN | 208471032 U | 2/2019 |
| GB | 1261644 | 1/1972 |
| JP | H06-19548 A | 1/1994 |

OTHER PUBLICATIONS

International Search Report and Written Opinion of the International Searching Authority issued for International PCT Application No. PCT/IB2021/056749 on Oct. 18, 2021.

*Primary Examiner* — Kavel Singh
(74) *Attorney, Agent, or Firm* — Howson & Howson LLP (57) ABSTRACT

A measurement assembly for measuring wear of the surface of revolution of rotating members is provided. The assembly comprises a support structure, a rod having a first sliding movement along a direction having a rectilinear component with respect to the support structure, a cam guide having a second relative movement with respect to the sliding rod, and at least one roller rotatably fixed to the sliding rod and in rolling contact with a corresponding track of the cam guide. The second relative movement between the cam guide and the sliding rod causes the first movement of the rod along the sliding direction. The measurement assembly may comprise an indicator of the position of the at least one roller along the rectilinear component such that the indicator is capable of generating an electrical signal indicative of the distance between the indicator and the roller.

15 Claims, 4 Drawing Sheets

(56) References Cited

U.S. PATENT DOCUMENTS

| | | | |
|---|---|---|---|
| 7,438,192 B1* | 10/2008 | Kohler | B07C 5/3404 |
| | | | 209/523 |
| 9,045,284 B2* | 6/2015 | Turlotte | B65G 19/02 |
| 9,463,591 B2* | 10/2016 | Winzinger | B65G 29/00 |
| 9,522,790 B2* | 12/2016 | Wilson | B65G 47/80 |
| 10,947,049 B2* | 3/2021 | Andreae | B65G 19/025 |
| 2004/0187441 A1 | 9/2004 | Cirio | |
| 2012/0186613 A1 | 7/2012 | Siegmund et al. | |
| 2019/0308820 A1 | 10/2019 | Andreae et al. | |

* cited by examiner

MEASUREMENT ASSEMBLY FOR MEASURING WEAR OF THE SURFACE OF REVOLUTION OF ROTATING MEMBERS, A MACHINE THAT INCORPORATES SAID ASSEMBLY AND METHOD OF MEASUREMENT

TECHNICAL FIELD

The invention relates to a measurement assembly for measuring wear of the surface of revolution of rotating members, a machine incorporating said assembly and a corresponding measurement assembly.

BACKGROUND ART

In several technical fields it is known to use rotating members, rotatably fixed to a motion-transmitting member and cooperating with a cam guide defining a non-rectilinear path for the rotating members, whereby imparting a first relative movement between the cam guide and the rotating members results in a second, sliding movement of the motion-transmitting member, along a direction having a substantially rectilinear component.

According to this arrangement of mechanical parts, the rotating members, typically consisting of rotating rollers, travel a plurality of paths while remaining in contact with a track defined by the cam guide and, accordingly, the surface of revolution, i.e. the outermost surface of the rollers which is in contact with said track, wears progressively and proportionally to the use and the pressure exerted by the rollers against the track. The sinuosity of the path imposed on the rollers by the guide, the speed with which the rollers slide over the track of the guide, and the material of which the rollers are made are three parameters that can influence wear of the rollers and, therefore, lifetime thereof. In addition, the combination of these factors and the variability of the environment in which the machines incorporating these mechanical members operate makes it difficult to forecast the state of wear of the rollers on the basis of statistical analyses deriving from the data collected on the same machine, or on similar machines, over time.

A typical field of use of this combination of mechanical members is represented by the field of the machines for treating containers, particularly bottles, such as, for example, capping machines, labeling machines and filling machines. This type of machines usually has a carousel comprising a plurality of reciprocating rods or pistons, which carry out, repeatedly and at very high frequency, back and forth movements along a substantially rectilinear direction, during rolling of rollers entraining the rods along a cam guide defining a sinuous path for said rollers.

In the aforesaid movement, said rods may be guided by pairs of rollers or single rollers rolling in contact with a corresponding track defined by the cam guide. Said rollers are usually known as cam-following rollers and are rotatably fixed to a fork integral with the rod. The fork is guided by the cam-following rollers, which, during normal operation, get worn over time, thus causing change in the vertical position of the fork and an alteration in the performance of the machine.

An example of a machine of the aforementioned type is described in EP1462411, which specifically concerns a head for applying aluminum capsules onto necks of bottles.

As is known, wear of the rollers may cause inaccurate operation of the machine, increased noise and a decrease in the overall performance, and these drawbacks are particularly critical and undesirable in the aforesaid bottling sector. It is therefore clear that the machine needs to be serviced promptly by replacing excessively worn rollers with new ones.

For this reason, there is also a clear need in many areas of technology to prevent machines of this type from working with worn-out rollers and in sub-optimal conditions.

A first problem to be solved and addressed by the present invention is therefore how to signal the onset of excessive wear conditions in the rollers of machines employing the described movements.

The replacement of the rollers further inevitably requires stopping the machine operation and requires considerable intervention time, this resulting in economic losses due to downtime and maintenance costs.

A second problem to be solved and addressed by the invention is therefore how to forecast wear of the rollers, so that, during the same downtime, it is possible to intervene simultaneously onto all the rollers requiring maintenance, thus avoiding a series of downtimes whenever replacement of a roller is required.

At present, according to prior art, the diameter of the rollers is measured periodically, at predetermined intervals, depending on the hours of operation of the machine, thus wasting time and labor.

Solutions for ascertaining wear of rotating rollers are known for example from US2019/0308820.

The application described in document GB1261644 (A) relates, for example, to a capping machine with a continuously moving conveyor, wherein a screw cap is applied, by means of counter-rotating friction rollers, to a container located on the conveyor. An automatic adjustment mechanism is provided so that the axis of rotation of the friction rollers moves in order to compensate wear of the peripheral rubber portion of the rollers. The teaching of this document is therefore limited to a solution for compensating the gap that is created as a result of the wear of the rubbing part of a rotating mechanical component, but it does not address the problem of how to diagnose and forecast wear of the rollers.

It is an object of the invention to provide a solution to the problem of how to ascertain the degree of wear of moving parts, such as rotating rollers, which support and guide mechanical devices actuating the rectilinear movements of parts of a machine.

More particularly, though not exclusively, the invention aims at providing a solution of the aforementioned problem that can be applied to cam-following rollers having the function of guiding the vertical hub of vertically moving parts, responsible for carrying out the step of applying closure elements onto containers, i.e. for capping or filling containers, especially bottles.

A further object of the invention is to provide a solution to the aforementioned problems, which is reliable and industrially applicable at low cost and therefore lends itself to large-scale industrial production.

These and other objects are achieved with the measurement assembly for measuring wear of the surface of revolution of rotating members, with the machine incorporating said measurement assembly and with the measuring method as claimed in the appended claims.

SUMMARY OF INVENTION

The objects of the invention are achieved substantially by means of a sensor of the degree of wear of the moving parts supporting and guiding the mechanical devices actuating the vertical movements of parts of a machine.

In a preferred embodiment, the invention provides a sensor in a stationary position, which sensor measures, in a contactless manner, the distance of a component connected to each machine roller from the sensor.

The signal generated by the sensor is further preferably processed by means of a processing algorithm, which has the purpose of providing a datum indicative of the state of wear of each roller present in the machine, in order to signal the state of wear thereof and possible need for replacement thereof.

The sensor carries out an indirect measurement, i.e. it detects wear of the rollers by detecting the variation of position of the surface of a machine component comprising, for example, a roller-supporting portion, preferably a roller-holding fork. By means of such variation of position, wear of the corresponding roller is detected and, by means of suitable predictive algorithms whose operation will become more evident from the following description, it is possible to forecast how wear of the rotating component will evolve and thus to signal in advance the need for replacement.

The measurement assembly for measuring wear of the surface or revolution, or surface of contact, of rotating members such as, for example, rollers, needle rollers, cylinders, bushings and the like, according to a preferred embodiment of the invention, mainly comprises:
   a support structure or frame;
   a rod, or piston, having a first sliding movement along a direction having a rectilinear component with respect to the support structure;
   a cam guide having a second relative movement with respect to the sliding rod and capable of causing movement of the rod along said sliding direction;
   at least one roller rotatably fixed to the sliding rod and in rolling contact with a corresponding track defined in said cam guide, whereby the second relative movement between the cam guide and the sliding rod causes the first movement of the rod along said sliding direction.

According to the invention, said measurement assembly comprises an indicator, or sensor, of the position of said roller along said rectilinear component, said indicator being capable of generating an electrical signal indicative of the distance between said indicator and said roller.

Preferably, the roller is rotatably fixed to the sliding rod, or piston, at an upper end of the rod, when the rod is mounted vertically relative to the support structure.

Preferably, the roll is rotatably fixed to the sliding rod by means of a support fork and, still preferably, the indicator is capable of generating an electrical signal indicative of the distance between said indicator and a portion, or end, of said fork proximal to said indicator and preferably along said rectilinear component of the sliding direction of the rod. Alternatively, the roller can be rotatably fixed directly to the sliding rod or piston.

According to a preferred embodiment of the invention, each rod comprises a pair of rollers rotatable about parallel axes, each roller being in rolling contact with a corresponding track defined in said cam guide.

According to this preferred embodiment of the invention, both rollers of each pair of rollers are rotatably fixed to the rod by means of the same fork.

In addition, the rotation axis of each roller of said pair of rollers preferably intersects said rectilinear component of the sliding direction of the rod.

According to the invention, the distance measured by the position sensor is preferably measured parallelly to said rectilinear component of the sliding direction of the rod.

According to a preferred embodiment of the invention, said measurement assembly comprises a plurality of said rods or pistons. In addition, the sensor preferably is a single sensor integral to the support structure and arranged in such a way as to measure the distance of the support fork of the rollers of each rod, when the rod is vertically aligned to the sensor. In other applications, several sensors associated to the support structure or the cam guide, or according to further arrangements, may be provided.

Preferably, said second movement is a periodic cyclic movement, capable of causing a back and forth movement of said rod.

According to the invention, the position sensor preferably is an inductive sensor based on eddy currents, of the type typically used for contactless measurement of displacements, distances, positions, thicknesses, oscillations and vibrations.

Preferably, the measurement assembly according to the invention further comprises a counter device, preferably associated to an electronic control unit, in which the signals coming from the position sensor are processed by means of an appropriate software. The counter device is capable of generating a signal indicative of the presence of one of the roller-holding rods. Said rod is usually referred to as "zero" rod, whereby the signal generated by the counter device upon passage of said "zero" rod corresponds to completion of an operation cycle in which all the remaining rods have passed at the position sensor.

Preferably, the measurement assembly further comprises a trigger sensor, preferably associated to said electronic unit and capable of generating a signal indicative of the passage of each rod at said trigger sensor.

According to a particular embodiment of the invention, during operation of the measurement assembly, each rod will pass at the counter device, but preferably only the "zero" rod equipped with means arranged to interact with the sensor will cause a corresponding signal to be generated by the counter device.

The signal generated by the trigger upon passage of any of the rods at the trigger, is processed in the electronic unit in order to increase the counter device, which will then be preferably zeroed upon passage of the "zero" rod. In this way, the electronic unit can advantageously associate the position values generated by the position sensors with the corresponding rod. Advantageously, it is thus possible to detect wear of the rollers in each rod and intervene onto those rollers requiring maintenance.

The method according to the invention essentially comprises a calibrating step, a measuring step and a forecasting and signaling step.

The calibrating step is preferably performed immediately after installation of the machine, or after a maintenance activity affecting the measurement assembly.

According to the invention, in a measurement assembly comprising a plurality of said sliding rods, said calibrating step is performed for each of said rods of said plurality of rods.

This calibrating step provides for a calibrating or setting cycle, having the purpose of identifying the values of comparison, for subsequent check of the wear of the rollers, during normal use of the machine.

For each sliding rod or piston, calibration values are determined at this step: average measured distance and measurement dispersion (maximum value and minimum value).

For each rod, measurement of the distance is carried our during operation of the machine and for a high number of cycles. Subsequently, a weighted moving average of the detected values is calculated, so as to filter possible abnormal fluctuations in the readings. Dispersion is also calculated thanks to the stored maximum and minimum values. For each rod, pairs of reference values, i.e. a value expressing the detected average distance and a value expressing the dispersion between the detected minimum and maximum values, are thus obtained.

The measuring step of the method according to the invention provides for measuring, preferably continuously, the position values for each rod, which values will be compared with what has been found and stored in the calibrating step.

According to the invention, there are provided maximum deviation values, i.e. deviation thresholds, of the values measured during normal operation of the machine, with respect to the values stored for each rod in the calibrating step. The deviation thresholds make it possible to determine two typical parameters and corresponding indexes of wear of the roller.

In particular, the deviation from the average value is indicative of the wear, i.e. of the diameter, of the roller, whereas the deviation from the dispersion value is indicative of the ovalization, i.e. the deviation from the circular shape or asymmetrical wear, of the roller.

Still according to the invention, the method further provides for a forecasting and signaling step, in which, based on the measurements acquired over time, a signal is generated indicative of the need to replace the worn-out roller and of whether such need is imminent, or of when the roller will have to be supplied and replaced. This forecast may also be based on statistical information stored in a database, and therefore by taking into account the operation of the same mechanical component, i.e., of the roller, on different machines, or may operate locally by means of a predictive algorithm.

The invention is particularly advantageous also by virtue of the selection of the preferred position of attachment of the sensor, of the type of sensor and of the use of the above-described measurement algorithm.

BRIEF DESCRIPTION OF DRAWINGS

Some preferred embodiments of the invention will be provided by way of non-limiting examples with reference to the annexed drawings, in which.

DESCRIPTION OF EMBODIMENTS

Figure 1A:
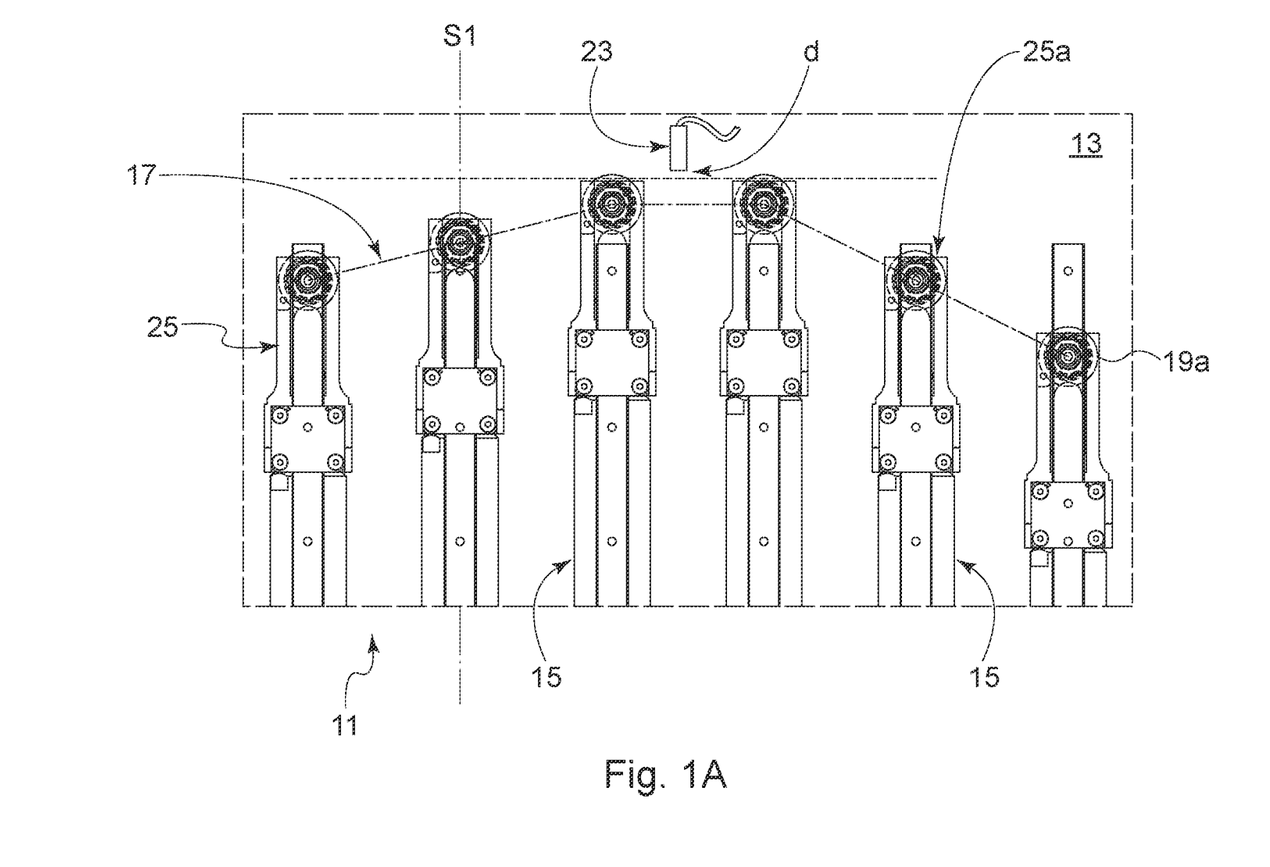
FIG. 1A is a schematic front view of a measurement assembly made in accordance with a preferred embodiment of the invention.
Figure 1B:
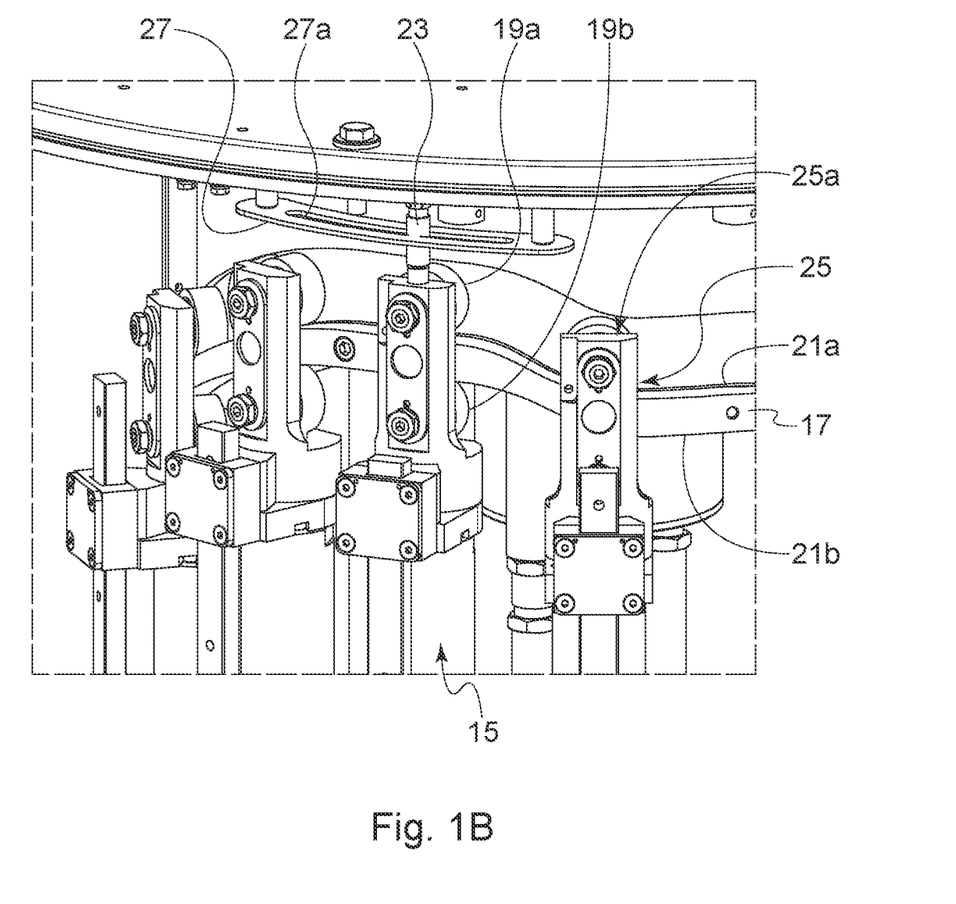
FIG. 1B is a perspective view of a detail of the measurement group of FIG. 1A.

Referring to the annexed FIGS. 1A and 1B, there is illustrated a measurement assembly 11 for measuring wear of the surface of revolution, or surface of contact, of rotating members, such as rollers, needle rollers, cylinders, bushings and the like, according to the invention.

In the illustrated embodiment, the assembly 11 essentially comprises:

a support structure 13;

a plurality of rods 15 having a first sliding movement, along a direction having a rectilinear component "S1" and parallel to the vertical axis of each rod 15, with respect to the support structure 13;

a cam guide 17 having a second relative movement with respect to the sliding rods 15, said second movement being capable of causing movement of the rod 15 along said sliding direction "S1";

a pair of rollers 19a, 19b rotatably fixed to each sliding rod 15 and in rolling contact with a corresponding track 21a, 21b defined in said cam guide 17, whereby the second relative movement between the cam guide 17 and the sliding rod 15 causes the first movement of the rod 15 along said sliding direction "S1".

According to the invention, said measurement assembly 11 comprises an indicator 23 or sensor of the position of at least one roller 19a of said pair of rollers 19a,19b along said rectilinear direction "S1", said indicator being capable of generating an electrical signal indicative of the distance between said indicator 23 and said at least one roller 19a of said pair of rollers 19a,19b. In the illustrated embodiment, the indicator 23 is capable of detecting the position of the upper roller 19a of said pair of rollers 19a, 19b, i.e. the roller closer to an upper end of the rod 15. In another embodiment of the invention, the indicator 23 is capable of detecting the position of both rollers 19a, 19b of said pair of rollers 19a, 19b, or only the position of the lower roller 19b, i.e. the roller distal with respect to the upper end of the rod 15.

In addition, in the illustrated embodiment, the indicator 23 or sensor is anchored to the support structure 13. In other embodiments, it may take a different position.

In this embodiment, the pair of rollers 19a,19b is rotatably fixed to the rod 15, at an upper end of the rod, when the rod is mounted vertically relative to the support structure 13. More particularly, the pair of rollers 19a,19b is rotatably fixed to the sliding rod 15 by means of a single support fork 25, and the indicator 23 is capable of generating an electrical signal indicative of the distance between said indicator 23 and the upper end 25a of said fork 25, proximal to said indicator 23.

The distance "d" measured by the position indicator 23 is measured parallelly to said rectilinear direction "S1" of sliding of the rod 15.

In addition, the indicator 23 is attached to the support structure 13 by means of a curved plate 27 provided with an eyelet 27a in which the indicator 23 is secured and allowing adjustment of the position of the indicator 23, whereby the indicator is aligned along the direction "S1" passing through the axes of rotation of both rollers 19a,19b when the corresponding rod 15 is vertically aligned to said sensor 23. Measurement of the distance "d" between the indicator 23 and the upper end 25a of the fork 25 takes place in this aligned position. The signal generated by the indicator 23 is sent, by means of a wire 23a, to an electronic control unit, not shown, programmed to process said signal and implement the measurement method according to the invention.

In this embodiment of the invention, the indicator 23 comprises an inductive position sensor based on eddy currents.

In the illustrated embodiment, the rotation axes of the rollers 19a,19b are parallel to each other and the rollers 19a,19b roll in contact with a corresponding rolling track 21a,21b defined in said cam guide 17.

In addition, the rotation axis of each roller 19a,19b of said pair of rollers intersects said rectilinear direction "S1" of sliding of the rod 15.

Figure 2:
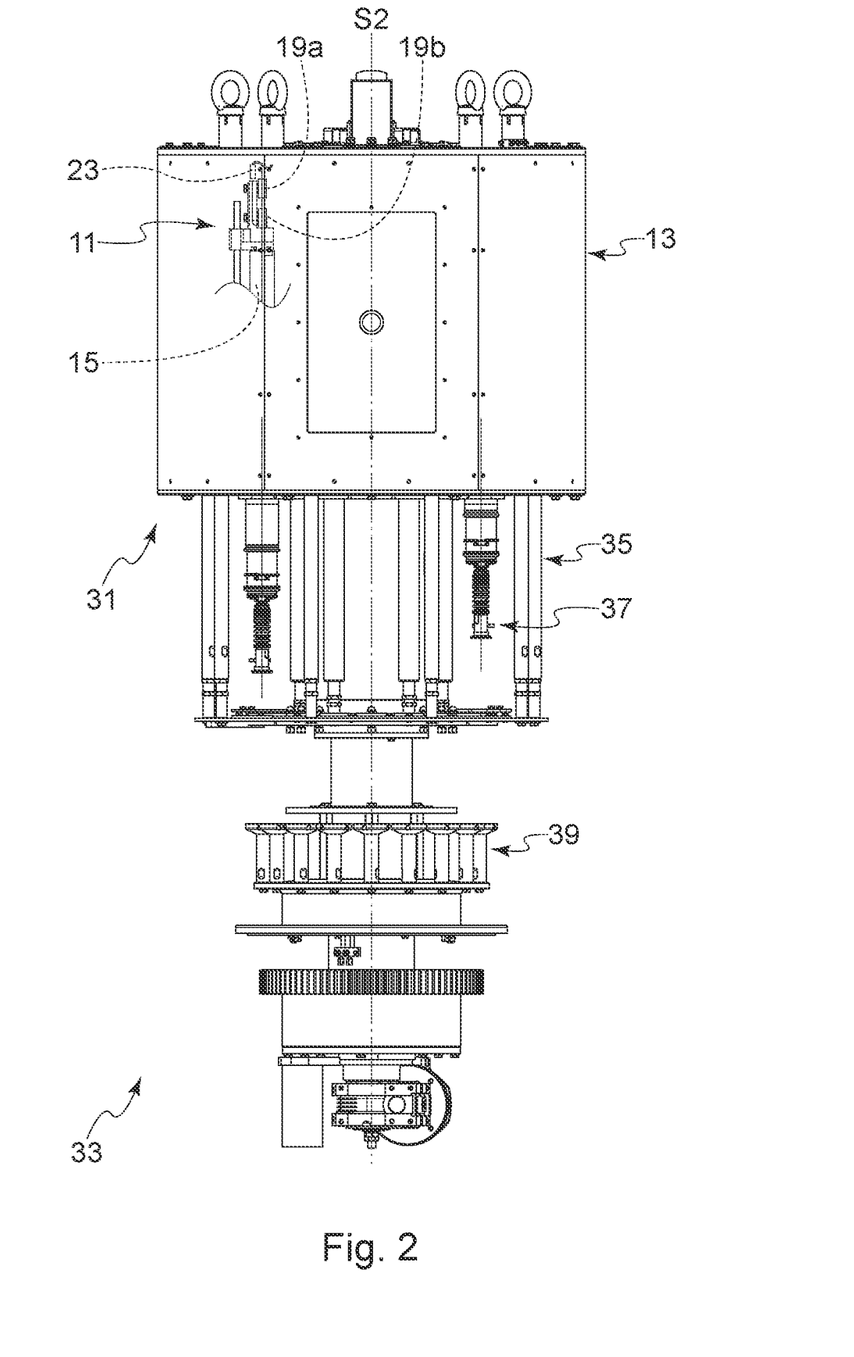
FIG. 2 is a front view of a rotating revolver of a capping machine incorporating the measurement assembly according to the invention.

Referring to FIG. 2, there is illustrated a revolver 31 of a capping machine 33 incorporating a measurement assembly 11 according to the invention.

The capping machine 33 comprises a support structure 13 on which a carousel 45 of capping heads 37, each of them being intended to apply a closure onto a corresponding bottle, is mounted rotatably about a vertical axis "S2". The bottles are intended to be brought to a platform 39, this platform too being rotatable about the same axis "S2" synchronously with the carousel 35, in such a way that each bottle carried by the rotating platform 39, which moves over a circular trajectory about the axis "S2", is followed by a corresponding capping head 37 after having received on its neck a cap to be applied coming from a cap reservoir, not shown.

During rotation of the carousel 35, each capping head 37 is lowered onto the bottle and carries out a vertical movement along the direction "S1" in such a way as to apply the cap onto the bottle.

In this embodiment, the relative movement between the carousel 35 and the cam guide 17 associated to the assembly 11 carried by the revolver 31 is a periodic cyclic movement, capable of causing a back and forth movement of each rod 15 along a corresponding direction "S1", thanks to the cooperation between the pair of rollers 19a,19b and the tracks 21a,21b of the cam guide 17.

Figure 3:
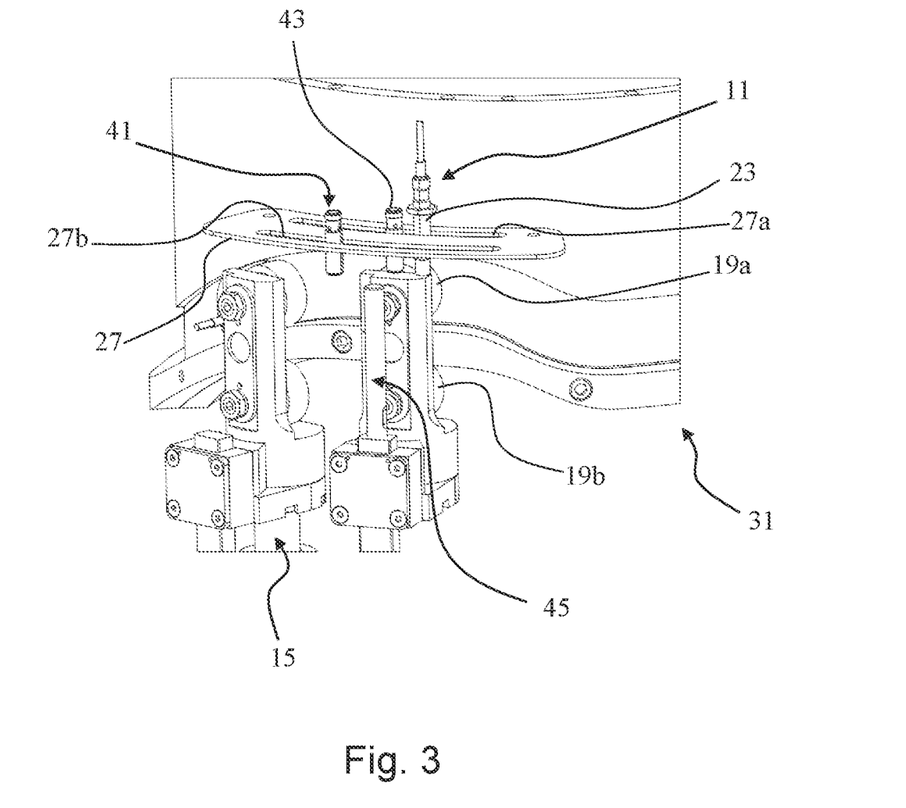
FIG. 3 is a view corresponding to FIG. 1B according to a particular embodiment of the invention.

Referring now to FIG. 3, there is illustrated a revolver 31 of a capping machine 33 incorporating a measurement assembly 11 according to a particular embodiment of the invention.

In this embodiment, the measurement assembly 11 further comprises a counter device 41, preferably associated to an electronic control unit in which the signals coming from the indicator 23 are processed by means of an appropriate software. The counter device 41 is capable of generating a signal indicative of the presence of one of the sliding rods 15 carrying the rollers 19a,19b. Said rod 15 is usually referred to as "zero" rod, whereby the signal generated by the counter device 41 upon passage of said "zero" rod corresponds to completion of an operation cycle during which all the remaining rods 15 have passed at the indicator 23.

Preferably, the measurement assembly 11 according to this embodiment of the invention further comprises a trigger sensor 43, preferably associated to said electronic unit and capable of generating a signal indicative of the passage of each rod 5 at said trigger sensor 43.

According to a particular embodiment of the invention, during operation of the measurement assembly 11, each rod 15 will pass at the counter device 41, but preferably only the "zero" rod equipped with means arranged to interact with the counter device 41 will cause a corresponding signal to be generated by said counter device 41.

The signal generated by the trigger 43 upon passage of any of the rods 15 at the trigger, is processed in the electronic unit in order to increase the counter device, which will then preferably be zeroed upon passage of the "zero" rod. In this way, the electronic unit can advantageously associate the position values generated by the indicator 23 with the corresponding rod 15. Advantageously, it is thus possible to detect wear of the rollers 19a,19b in each rod 15 and intervene only onto those rollers requiring maintenance.

According to a particular embodiment of the invention, said means arranged to interact with the counter device 41 comprise a cylindrical reference element 45 attached to the rod 15 that has been selected as "zero" rod, preferably in parallel to the rectilinear component of the sliding direction of the rod 15. In addition, the plate 27 will advantageously be provided with a second eyelet 27b in which the counter device 41 is secured.

Therefore, in the illustrated embodiment, the counter device 41 is attached to a rotation diameter different from and greater than the diameters of wear indicator 23 and trigger 43, said wear indicator and trigger being both received in the eyelet 23a.

During operation, the rod 15 selected as "zero" rod passes, at each rotation, at the counter device 41, whereby the software recognizes that a complete rotation has been performed.

Upon passage of the fork at the trigger 43, arranged immediately upstream of the indicator 23, the software updates the counter device 41 by increasing it from piston to piston until the total number of pistons is reached, and records the corresponding degree of wear by associating it to its piston.

The invention as described and illustrated is susceptible of several modifications and variations falling within the same inventive principle.

The invention claimed is:

1. A container treatment machine comprising a measurement assembly (11) for measuring wear of the surface of revolution of rotating members, said measurement assembly comprising:
    a support structure (13);
    a rod (15) having a first sliding movement along a direction having a rectilinear component (S1) with respect to the support structure (13);
    a cam guide (17) having a second relative movement with respect to the sliding rod (15);
    at least one roller (19a, 19b) rotatably fixed to the sliding rod (15) and in rolling contact with a corresponding track (21a, 21b) of said cam guide (17), whereby the second relative movement between the cam guide (17) and the sliding rod (15) causes the first movement of the rod (15) along said sliding direction (S1);
    wherein said measurement assembly (11) comprises an indicator (23) of the position of said at least one roller (19a, 19b) along said rectilinear component (S1), said indicator being capable of generating an electrical signal indicative of the distance (d) between said indicator (23) and said roller (19a, 19b), characterized in that said distance (d) is compared with at least one deviation threshold in order to ascertain the degree of wear of a surface of said at least one roller (19a, 19b) and in that said distance (d) is compared with at least one deviation threshold of values measured during normal operation of the machine, with respect to values stored during a calibrating step.

2. The container treatment machine according to claim 1, wherein said roller (19a, 19b) is rotatably fixed to the sliding rod (15) by means of a support fork (25), and wherein the indicator (23) is capable of generating an electrical signal indicative of the distance between said indicator (23) and an end (25a) of said fork (25) proximal to said indicator (23).

3. The container treatment machine according to claim 1, wherein said rod (15) comprises a pair of rollers (19a, 19b) rotatable about parallel axes, each roller being in rolling contact with a track (21a, 21b) of said cam guide.

4. The container treatment machine according to claim 1, wherein the rotation axis of each roller (19a, 19b) of said pair of rollers (19a, 19b) intersects said rectilinear component.

5. The container treatment machine according to claim 1, wherein said distance (d) is measured parallelly to said rectilinear component.

6. The container treatment machine according to claim 1, wherein said assembly comprises a plurality of said rods (15).

7. The container treatment machine according to claim 1, wherein said second movement is a periodic cyclic movement, capable of causing a back and forth movement of said rod (15).

8. The container treatment machine according to claim 1, wherein said indicator (23) is a contactless touch sensor.

9. The container treatment machine according to claim 1, wherein there is further provided a counter device (41) capable of generating a signal indicative of the presence of one of the sliding rods (15) holding the rollers (19a, 19b), whereby the signal generated by the counter device (41) upon passage of said rod corresponds to completion of an operation cycle during which all the remaining rods (15) have passed at the indicator (23).

10. The container treatment machine according to claim 9, wherein there is further provided a trigger sensor (43) capable of generating a signal indicative of the passage of each rod (15) at said trigger sensor (43).

11. A measurement method for measuring wear of the surface of revolution of rotating members in a container treatment machine comprising a measurement assembly of the type comprising:
    a support structure (13);
    a rod (15) having a first sliding movement along a direction having a rectilinear component (S1) with respect to the support structure (13);
    a cam guide (17) having a second relative movement with respect to the sliding rod (15);
    at least one roller (19a, 19b) rotatably fixed to the sliding rod (15) and in rolling contact with a corresponding track (21a, 21b) of said cam guide (17), whereby the second relative movement between the cam guide (17) and the sliding rod (15) causes the first movement of the rod (15) along said sliding direction (S1),
    wherein the measurement method comprises the step of providing an indicator (23) of the position of said at least one roller (19a, 19b) along said rectilinear component (S1), said indicator being capable of generating an electrical signal indicative of the distance (d) between said indicator (23) and said roller (19a, 19b), characterized in that said distance (d) is compared with at least one deviation threshold in order to ascertain the degree of wear of a surface of said at least one roller (19a, 19b) and in that said distance (d) is compared with at least one deviation threshold of values measured during normal operation of the machine, with respect to values stored during a calibrating step.

12. The method according to claim 11, wherein the calibrating step comprises a number of cycles of operation of the measurement assembly and measuring of the moving average of said distance and measurement dispersion.

13. The method according to claim 11, wherein said assembly comprises a plurality of said rods (15), and wherein said step of calibrating said measurement assembly comprises a step of calibrating each of said rods of said plurality of rods (15).

14. The method according to claim 13, comprising a step of assessing the presence of one of the sliding rods (15) by means of a counter device (41) capable of generating a signal indicative of the presence of said sliding rod (15) holding the rollers (19a, 19b), whereby the signal generated by the counter device (41) upon passage of said rod corresponds to completion of an operation cycle during which all the remaining rods (15) have passed at the indicator (23).

15. The method according to claim 13, further comprising a step of recognizing each rod (15) by means of a trigger sensor (43) capable of generating a signal indicative of the passage of each rod (15) at a trigger sensor (43).

* * * * *